United States Patent [19]

Tadokoro et al.

[11] Patent Number: 4,566,412
[45] Date of Patent: * Jan. 28, 1986

[54] INTAKE SYSTEM FOR ROTARY PISTON ENGINE

[75] Inventors: Tomoo Tadokoro; Hideo Shiraishi; Haruo Okimoto, all of Hiroshima, Japan

[73] Assignee: Mazda Motor Corporation, Hiroshima, Japan

[*] Notice: The portion of the term of this patent subsequent to Jan. 7, 2003 has been disclaimed.

[21] Appl. No.: 555,534

[22] Filed: Nov. 28, 1983

[30] Foreign Application Priority Data

Nov. 27, 1982 [JP] Japan .................................. 57-208152

[51] Int. Cl.⁴ ............................................. F02B 53/04
[52] U.S. Cl. ..................................... 123/216; 123/242
[58] Field of Search .................... 123/216, 242, 52 M, 123/219

[56] References Cited

U.S. PATENT DOCUMENTS

| | | |
|---|---|---|
| 3,491,733 | 1/1970 | Souhis . |
| 4,020,800 | 5/1977 | Ishikawa .............................. 123/219 |
| 4,425,883 | 1/1984 | Tadokoro et al. ................... 123/216 |

FOREIGN PATENT DOCUMENTS 99827   3/1978   Japan .................................. 123/216

Primary Examiner—Michael Koczo
Attorney, Agent, or Firm—Fleit, Jacobson, Cohn & Price

[57] ABSTRACT

A two rotor type rotary piston engine includes an intake system comprised of individual intake ports provided in at least one of the intermediate and side housings to open to the respective rotor cavities and adapted to be cyclically closed by the rotors as the rotor rotate, an intake passage including a throttle valve and individual passages leading respectively to the intake ports and communicated with each other by communicating passages downstream of the throttle valve. The intake port includes a main port having an opening period of 230° to 290° in terms of angle of rotation of the eccentric shaft and an auxiliary port having an opening period of 270° to 320° in terms of the angle of rotation of the eccentric shaft. The auxiliary port is normally closed but opened in heavy load operation by a control valve and has a closing timing later than that of the main port. The communication passages and the individual passages leading to the respective rotor cavities have overall length between 0.57 and 1.37 m so that a compression wave produced in one individual passage in opening timing of one intake port is transmitted to the other intake port just before the other intake port is closed to obtain an additional charge under engine speed ranges of 3000 to 4500 rpm and 5000 to 7000 rpm.

15 Claims, 5 Drawing Figures

F I G. 4
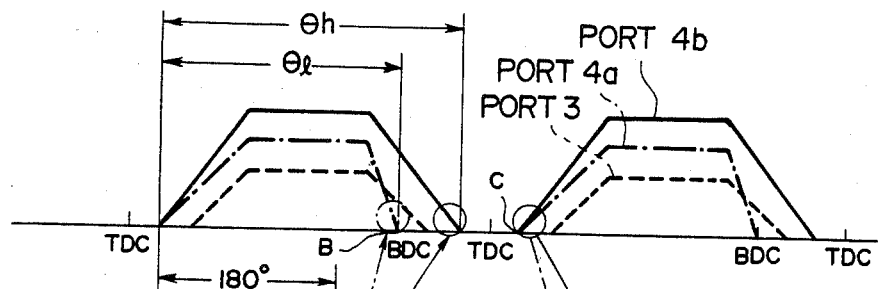
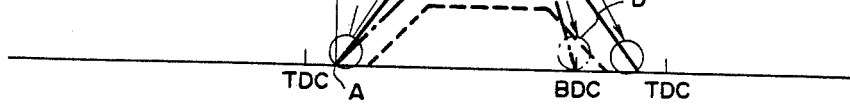
ANGLE OF ROTATION OF ECCENTRIC SHAFT
F I G. 5
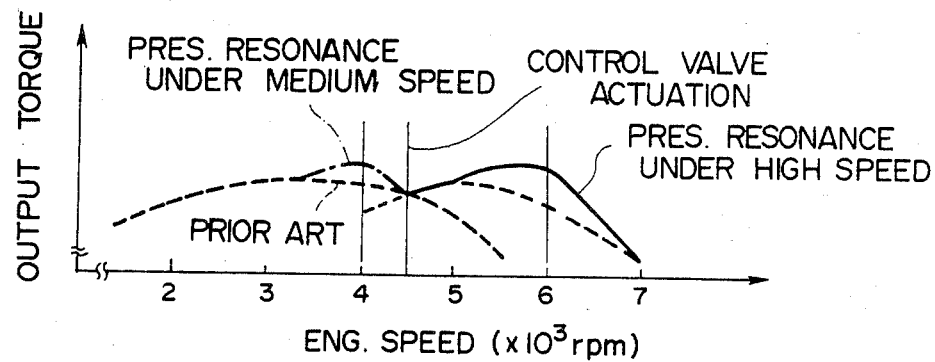

INTAKE SYSTEM FOR ROTARY PISTON ENGINE

The present invention relates to rotary piston engines, and more particularly to intake systems for rotary piston engines. More specifically, the present invention pertains to side port type intake systems for two-rotor rotary piston engines.

In general, a rotary piston engine includes a casing comprised of a rotor housing having an inner wall of trochoidal configuration, a pair of side housings secured to the opposite sides of the rotor housing to define a rotor cavity in the rotor housings. A rotor of substantially polygonal configuration is disposed in the rotor cavities and has flanks which define, with the inner wall of the rotor housing, working chambers having volumes which are cyclically changed as the rotor rotates. The rotor housing is generally formed with an exhaust port whereas the side housings are formed with intake ports so that intake, compression, combustion, expansion and exhaust cycles are conducted sequentially in each of the working chambers.

In this type of rotary piston engines, it has been proposed to utilize pulsations in the intake passage so that effective feed of intake gas can be accomplished throughout a wide range of the engine operating speed. For example, the U.S. Pat. No. 3,491,733 issued on Jan. 27, 1970 to Soubis et al. teaches to separate the intake passage into two passages of different lengths and connect these separated passages to two separated intake ports having different port closing timings so that the two passages and the two intake ports are used under a high speed engine operation whereas only one passage and only one intake port having earlier port closing timing are used under a low speed engine operation. With this arrangement, it is possible to feed the intake charge with resonance under a wide engine operating speed.

It should however be noted that the U.S. patent relates to a single rotor type rotary piston engine and there is no precise teaching as to how the pulsations in the passages are utilized. Further, the U.S. patent discloses a so-called peripheral port type rotary piston engine having the intake ports provided in the rotor housing. This type of engine is considered disadvantageous in that the intake ports are overlapped with the exhaust port so that the exhaust gas is blown under its own pressure into the intake working chamber decreasing the intake gas charge. In engines of recent years, there is a tendency that the exhaust gas pressure is increased due to facilities for suppressing engine noise and for purifying engine exhaust gas. In engines having turbo-superchargers, the exhaust gas pressure is further increased. Therefore, the peripheral port type intake system is not satisfactory to increase the intake charge utilizing the resonance effect.

It is therefore an object of the present invention to provide an intake system for two-rotor type rotary piston engines in which pulsations in intake passages can effectively be utilized to increase the intake gas charge.

Another object of the present invention is to provide a side port type intake system for two-rotor type rotary piston engines in which pulsations in the intake passage for one rotor cavity are utilized to increase the charge in the other rotor cavity.

A further object of the present invention is to provide a side port type intake system for two-rotor type rotary piston engines which can effectively produce a pressure resonance effect not only in high speed engine operating range but also in medium speed range to obtain an increased intake charge.

The present invention is based on the findings that a compression wave is produced in the vicinity of the intake port when the port is opened under the influence of the pressure of the residual combustion gas and that there is a tendency in recent engines that the compression wave is intensified due to the increase in the exhaust gas pressure. Thus, according to the present invention, the compression wave produced in one intake passage leading to one rotor cavity is transmitted through the other intake passage to the intake ports opening to the other rotor cavity just before the particular intake ports are closed to produce a pressure resonance intake charging effect. The present invention is significant in that each rotor cavity has two intake ports of different closing timings so that the pressure resonance effect can be obtained at both medium and high speed ranges.

According to the present invention, there is therefore provided a two rotor type rotary piston engine including a casing comprised of a pair of rotor housings each having an inner wall of trochoidal configuration, an intermediate housing located between the rotor housings and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, said rotors being carried by eccentric shaft means so that said rotors are rotated with 180° phase difference in terms of angle of rotation of said eccentric shaft means, intake means including individual intake port means provided in at least one of said intermediate and side housings to open to the respective rotor cavities and adapted to be cyclically closed by said rotors as the rotor rotates, said intake port means including main port means and auxiliary port means which is adapted to be closed later than said main port means, intake passage means including throttle valve means, said intake passage means including individual passage means leading respectively to said intake port means and communicated with each other by communicating passage means downstream of said throttle valve means, control valve means associated with said auxiliary port means and adapted to be opened under a high speed engine operation, said intake port means having opening period of 230° to 290° in terms of angle of rotation of said eccentric shaft means when the control valve means is closed and that of 270° to 320° in terms of the angle of rotation of said eccentric shaft means when the control valve means is opened, said communication passage means and said individual passage means leading to the respective rotor cavities having overall length between 0.57 and 1.37 m so that a compression wave produced in one individual passage means in opening timing of one intake port means is transmitted to the other intake port means just before said other intake port means is closed to obtain an additional charge under medium and high engine speed ranges such as 3000 to 4500 rpm and 5000 to 7000 rpm. In a preferable aspect of the present invention, the communication passage means includes surging chamber means having an increased volume. In each intake port means, the main and auxiliary ports may be provided in the same side or intermediate housing.

According to the present invention, it is desired to obtain the pressure resonance effect under a speed range of 5000 to 7000 rpm. This engine speed range is recommended in view of the fact that most of the engines are designed to produce the highest output power in this speed range so that the most significant improvement can be obtained in respect of increase in the intake charge and the output power. Further, it is additionally desired to obtain the pressure resonance effect under a medium speed range of 3000 to 4500 rpm. In order to determine the higher and lower resonance speeds, it is preferred to take into account the engine speed at which the control valve means is opened. More specifically, the higher resonance speed should preferably be greater by 500 rpm than the control valve opening engine speed and the lower resonance speed be smaller by 500 rpm than the control valve opening engine speed. This is because that the pressure resonance charging effect can substantially be obtained in approximately 500 rpm range at each side of the resonance speed. When the control valve means is opened, the intake action can be effected at least in this period. It should however be noted that, in choosing the intake port opening period of 270°, the opening and closing timings of the intake port should not be exactly at the top and bottom dead centers but preferably be retarded therefrom taking into account the possible delay of the intake gas flow due to the inertia of the intake gas. The upper limit value 320° of the intake port opening period is determined from the viewpoint of avoiding two adjacent working chambers being communicated each other through the intake port. In actual practice, the working chambers are separated by side seals provided on side surface of the rotor so that the actual intake port opening period is increased by approximately 40° than the value calculated geometrically based on the configuration of the rotor. Therefore, the intake port opening period may be determined taking the positions of the side seals into account. However, in determining the above upper limit value, it is not necessary to take into account the positions of side seals because in high engine speed range which the present invention is concerned with the small clearance formed between the side surface of the rotor and the side or intermediate housing does not have any influence.

When the control valve means is closed, the intake port opening period shall be at least 230° in terms of angle of rotation of the eccentric shaft in order to ensure sufficient amount of intake gas charge. Further, the intake port opening period shall not be greater than 290° because the main intake port means is primarily used in low and medium speed engine operation so that its closing timing shall not be later than approximately 50° after bottom dead center in order to avoid blow back of intake gas to the intake passage whereas its opening timing shall not be earlier than approximately 30° before top dead center in order to prevent the side seals from being fallen in the intake port.

It is important to locate the communication passage downstream of the throttle valve because otherwise the throttle valve will produce a resistance to the propagation of the compression wave. The overall length of the communication and individual passages is obtained by the formula $$L = (\theta - 180 - \theta_o) \times 60/360N \times C \quad (1)$$

where:
L is the overall length;
$\theta$ is the intake port opening period;
N is the engine speed;
C is the sonic speed;
$\theta_o$ is the inactive period which is the sum of the period between the opening timing of the intake port and generation of the compression wave, and the period required for accomplishing a satisfactory charge increase before the full close of the intake port, and this inactive period is approximately 20°.

It will thus be understood that the term $(\theta - 180 - \theta_o)$ represents the angle of rotation of the eccentric shaft corresponding to the period from generation of the compression wave at one intake port to the time at which the compression wave reaches the other intake port.

The term 60/360N represents the time period required for one revolution of the engine. Since the sonic speed C is 343 m/sec. at the ambient temperature of 20° C., the length L becomes 0.57 to 1.37 m for the engine speed N of 5000 to 7000 rpm with the control valve open and for the engine speed N of 3000 to 4500 rpm with the control valve closed. In the equation (1), the influence of the intake air flow on the propagation of the compression wave is neglected because the intake flow speed is small in relation to the sonic speed. It should be noted that, according to the present invention, the pressure resonance charging effect can be accomplished at two different engine speed zones under the same overall length valve L due to the difference in the closing timings of the main and auxiliary intake ports. In order to obtain a desired result, the opening period $\theta l$ for the main intake port should preferably have the following relationship with the opening period $\theta_h$ for the auxiliary intake port.

$$\theta l = 180° + \theta_o + (\theta_h - 180° - \theta_o) \times Nl/N_h \quad (2)$$

where:
$Nl$ is the medium engine speed at which the pressure resonance effect is obtained;
$N_h$ is the high engine speed at which the pressure resonance effect is obtained.

The above and other objects and features of the present invention will become apparent from the following descriptions of preferred embodiments taking reference to the accompanying drawings, in which:

FIG. 4 is a diagram showing intake port timings in the engine shown in FIGS. 1 through 3; and, FIG. 5 is an engine output torque curve showing the improvement accomplished by the present invention.

Figure 1:
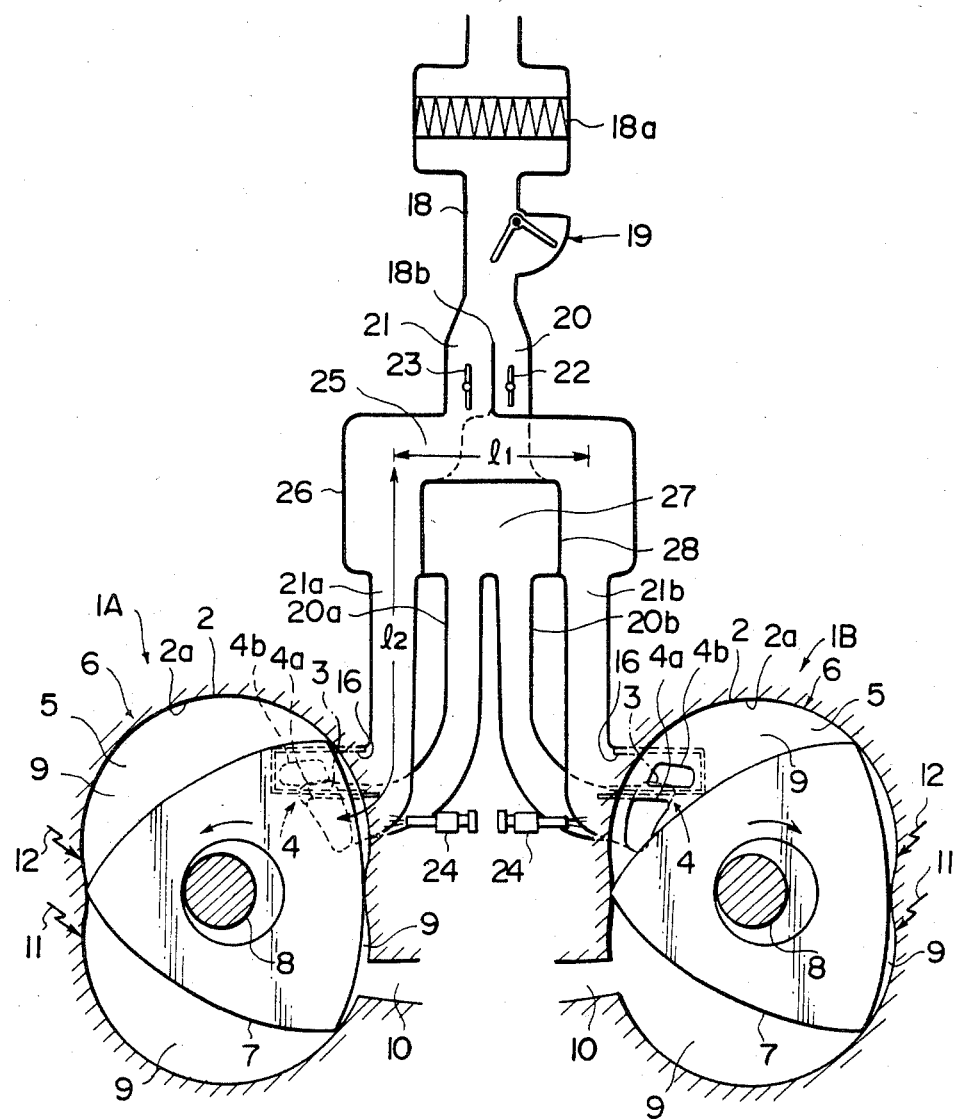
FIG. 1 is a diagrammatical sectional view of a rotary piston engine in accordance with one embodiment of the present invention.
Figure 2:
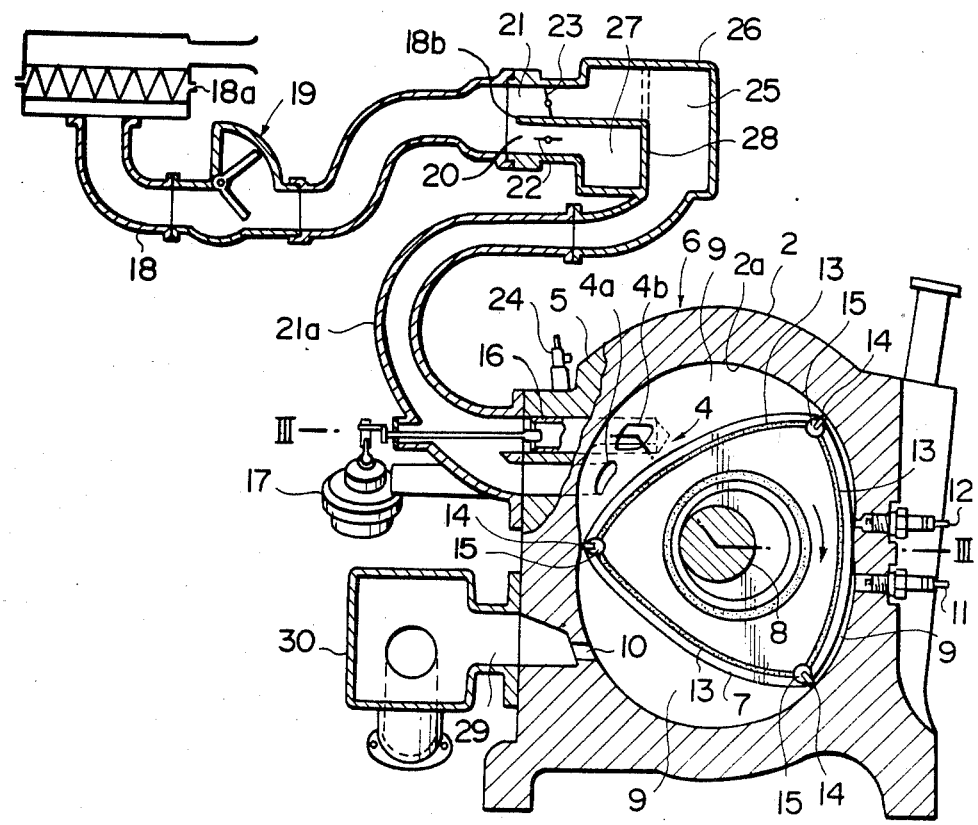
FIG. 2 is a sectional view showing the details of the intake system employed in the engine shown in FIG. 1.
Figure 3:
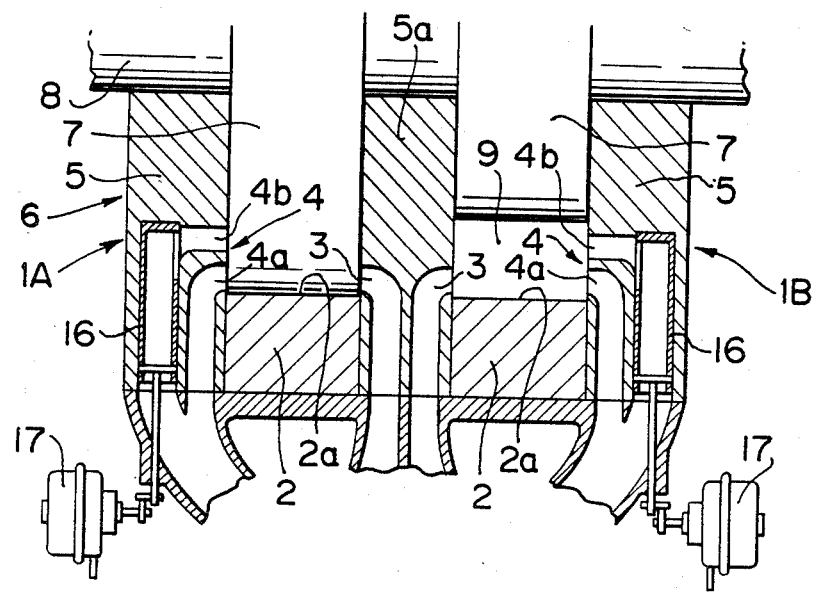
FIG. 3 is a sectional view taken substantially along the line III—III in FIG. 1.

Referring to the drawings, particularly to FIGS. 1 through 3, there is shown a two-rotor type rotary piston engine comprised of a pair of engine sections 1A and 1B. The engine sections 1A and 1B respectively have rotor housings 2 which are formed with inner walls 2a of trochoidal configuration. An intermediate housing 5a is located between the rotor housings 2 to separate them one from the other as shown in FIG. 3. The outer sides of the rotor housings 2 are attached with side housings 5 which are formed with heavy load intake ports 4. Thus, the rotor housings 2, the side housings 5 and the intermediate housing 5a constitute a casing 6 in which a pair of rotor cavities are defined. In the intermediate housing 5a, there are formed light load intake ports 3 respectively opening to the rotor cavities.

In each of the rotor cavities, there is disposed a rotor 7 of substantially triangular configuration. The rotors 7 are carried by an eccentric shaft 8 and have apex portions provided with apex seals 14 and corner seals 15. Further, the rotors 7 are provided at their side surfaces with side seals 13. The rotors 7 are rotatable with their apex seals 14 in sliding contact with the inner walls 2a of the rotor housings 2. The side seals 13 are maintained in sliding contact with the surfaces of the side housings 5 and the intermediate housing 5a. Thus, in each of the rotor cavities in the casing 6, there are defined working chambers 9 of which volumes cyclically change as the rotor 7 rotates. The eccentric shaft 8 carries the rotors 7 with 180° phase difference between the rotors 7. The rotor housings 2 are formed with exhaust ports 10 and provided with ignition plus 11 and 12. The exhaust port 10 is connected with an exhaust passage 29 leading to an exhaust mainfold 30.

The intake system of the engine includes an air cleaner 18a connected with a common intake passage 18 provided with an air-flow detector 19. The common intake passage 18 leads to a primary intake passage 20 and a secondary intake passage 21. The intake passage 20 is provided with a primary throttle valve 22 which is manually controlled by an engine control member to open in accordance with the engine load. The intake passage 21 is provided with a secondary throttle valve 23 which is opened when the engine control member is actuated further after the primary throttle valve 22 has been substantially fully opened. The primary intake passage 20 leads to a surge tank 28 which is in turn connected with a pair of individual intake passages 20a and 20b leading respectively to the intake ports 3 opening to the respective rotor cavities. In the vicinity of each intake port 3, the intake passage is provided with a fuel injecting nozzle 24. The surge tank 28 provides a communication passage 27 between the individual intake passages 20a and 20b.

The secondary intake passage 21 is connected with a surge tank 26 which leads to a pair of individual intake passages 21a and 21b leading respectively to the intake ports 4 opening to the respective rotor cavities. The surge tank 26 provides a communication passage 25 between the individual intake passages 21a and 21b. Each of the heavy load intake ports 4 is comprised of a main intake port 4a and an auxiliary intake port 4b. The auxiliary intake port 4b is provided with a rotary type control valve 16 which opens the auxiliary intake port 4b under a heavy load operation. For the purpose, the control valve 16 is connected with an actuator 17 which functions to open the valve 16 under a heavy engine load and when the engine speed has reached a valve operating speed which is preliminarily determined at a suitable value between 3500 to 5000 rpm.

As well known in the art, the intake ports 3 and 4 are cyclically opened by the rotors 7 and the opening period of each auxiliary intake port 4b is 270° to 320° in terms of angle of rotation of the eccentric shaft 8. The main intake port 4a has an opening period of 230° to 290° and satisfy the requirements in the equation (2). Further, the main intake port 4a has a closing timing which is earlier than that of the auxiliary intake port 4b by approximately 20° to 60° in terms of the angle of rotation of the eccentric shaft. The opening timing of the heavy load intake port 4 is the same as or earlier than that of the light load intake port 3. In FIG. 1, it will be noted that the individual intake passages 21a and 21b are located downstream the throttle valve 23 and have lengths $l_2$. Further, the openings of the individual intake passages 21a and 21b are spaced apart by a distance $l_1$ in terms of a center-to-center spacing. The surge tank 21 thus provides a communication passage 25 for the individual intake passages 21a and 21b. Since the surge tank 25 has a relatively large volume, it is possible to transmit a compression wave from one individual intake passage to the other without any significant attenuation. The overall length L of the individual intake passages 21a and 21b and the communication passage 25 is calculated by the formula $L = l_1 + 2l_2$ and this overall length is determined at a value between 0.57 and 1.37 m.

Referring now to FIG. 4, in operation of the engine, the compression wave is produced at the intake port 4 of one engine section, for example, the engine section 1B when the subject intake port 4 is opened as shown at A. The compression wave is transmitted through the individual passages 21a, 21b and the communication passages 25 to the intake port 4 of the other engine section, for example, the engine section 1A. Under a medium speed engine operation, for example, of 3000 to 4500 rpm in which the auxiliary intake port 4b is closed by the control valve 16, since the overall length L is determined as described previously, the compression wave reaches the main intake port 4a in the other engine section just before the subject intake port 4a is closed as shown by B. The compression wave functions to prevent blow-back of intake gas from the intake working chamber at the final stage of the intake stroke and provide an additional charge. Similarly, the compression wave produced at the main intake port 4a of the engine section 1A as shown by C in FIG. 4 is transmitted to the main intake port 4a of the engine section 1B just before the intake port 4a is closed as shown by D. Thus, it is possible to obtain an increase in the engine output torque as shown by the dotted line curve in FIG. 5.

Under a high engine speed, for example, of 5000 to 7000 rpm in which the auxiliary intake port 4b is opened, the compression wave cannot reach the main intake port 4a before it is closed because of the increased engine speed. However, since the auxiliary intake port 4b is opened even after the main intake port 4a is closed, the compression wave reaches the auxiliary intake port 4b just before the subject intake port 4b is closed producing a similar effect. Thus, it is possible to provide an increased engine output under a high speed operation as shown by a full line curve in FIG. 5.

In the example shown in FIG. 4, the heavy load intake port 4 is opened earlier than the light load intake port 3. This port timing is advantageous in that it can utilize the influence of the compression wave more effectively to thereby produce a strong pressure resonance effect. Usually, the secondary individual intake passages 21a and 21b have cross-sectional areas which are greater than those of the primary individual intake passages 20a and 20b. Therefore, it is possible to have the compression wave produced at one heavy load intake port 4 transmitted to the other port 4 without substantial attenuation. It should however be noted that the concept of the present invention can well be applied not only to the heavy load intake port 4 but also to the light load intake port 3. Further, the present invention can also be applied to an intake system having a single intake passage leading to each of a pair of rotor cavities.

The invention is applicable not only to a fuel injection type engine but also to a carburetor type engine although the application to a fuel injection type engine is more preferable than to a carburetor type engine.

The invention has thus been shown and described with reference to specific embodiments, however, it should be noted that the invention is in no way limited to the details of the illustrated structures but changes and modifications may be made without departing from the scope of the appended claims.

What is claimed is:

1. A two rotor type rotary piston engine comprising:
   a casing comprised of
       a pair of rotor housings, each rotor housing having an inner wall of trochoidal configuration,
       an intermediate housing located between the rotor housings, and
       a pair of side housing secured to outer sides of the respective rotor housings to define rotor cavities in the respective rotor housings,
   a pair of substantially polygonal rotors disposed in the respective rotor cavities with apex portions in sliding engagement with the inner walls of the respective rotor housings to define working chambers of cyclically variable volumes,
   eccentric shaft means carrying said rotors so that said rotors are rotated with 180° phase difference in terms of angle of rotation of said eccentric shaft means,
   intake means including
       two individual intake port means provided in at least one of said intermediate and side housings and opening to the respective rotor cavities and being cyclically closed by said rotors as the rotors rotate, each of said two individual intake port means including main port means and auxiliary port means, said auxiliary port means being closed later than said main port means,
       intake passage means including throttle valve means, said intake passage means including two individual passage means leading respectively to said two individual intake port means,
       communicating passage means communicating with said two individual passage means and being located downstream of said throttle valve means,
   control valve means for opening and closing said auxiliary port means,
   said two individual intake port means having an opening period of 230° to 290° in terms of angle of rotation of said eccentric shaft means when the control valve means is closed and an opening period of 270° to 320° in terms of angle of rotation of said eccentric shaft means when the control valve means is opened,
   said communication passage means and said two individual passage means leading to the respective rotor cavities having an overall length between 0.57 and 1.37 m for transmitting a compression wave produced in one of said two individual passage means in opening timing of one of said two individual intake port means to the other of said two individual intake port means just before said other of said two individual intake port means is closed to obtain an additional intake charge.

2. A rotary piston engine in accordance with claim 1 further comprising fuel injection nozzle means provided in said individual passage means and said fuel injection nozzle means located downstream from said communicating passage means in a flow path of intake air.

3. A rotary piston engine in accordance with claim 1 in which said communication passage means includes enlarged chamber means.

4. A rotary piston engine in accordance with claim 1 in which said main port means and said auxiliary port means for one rotor cavity are formed in one of the side and intermediate housings and the other of the side and intermediate housings is formed with light load intake port means connected with further individual passage means.

5. A rotary piston engine in accordance with claim 4 in which said throttle valve means includes primary throttle valve means for controlling intake gas flow to said further individual passage means and secondary throttle valve means for controlling the intake gas flow to the first mentioned individual passage means, said secondary throttle valve means being opened after the primary throttle valve means is substantially opened.

6. A rotary piston engine in accordance with claim 1 in which said main port means and said auxiliary port means have the same opening timing.

7. A rotary piston engine in accordance with claim 5 in which said light load intake port means has an opening timing later than those of said main port means and said auxiliary port means.

8. A two-rotor type rotary piston engine comprising:
   a casing comprised of
       a pair of rotor housings, each rotor housing having an inner wall of trochoidal configuration,
       an intermediate housing located between the rotor housing, and
       a pair of side housing secured to outer sides of the respective rotor housings to define rotor cavities in the respective rotor housings,
   a pair of substantially polygonal rotors disposed in the respective rotor cavities with apex portions in sliding engagement with the inner walls of the respective rotor housings to define working chambers of cyclically variable volumes,
   eccentric shaft means carrying said rotors so that said rotors are rotated with 180° phase difference in terms of angle of rotation of said eccentric shaft means,
   intake means including
       a pair of first intake port means formed in one of said side and intermediate housings and opening to respective ones of the rotor cavities,
       a pair of second intake port means formed in the other of said and intermediate housings and opening to respective ones of the rotor cavities,
       first throttle valve means for controlling intake gas flow to said pair of first intake port means, and
       second throttle valve means being opened after the first throttle valve means is substantially opened for controlling intake gas flow to said pair of second intake port means, said pair of second intake port means each including main port means and auxiliary port means, said auxiliary port means being closed later than said main port means,
   control valve means for opening and closing said auxiliary port means, said pair of second intake port means having a port opening period of 230° to 290° in terms of the angle of rotation of said eccentric shaft means when the control valve means is closed and a port opening period of 270° to 320° in terms of angle of rotation of said eccentric shaft means when the control valve is opened, passage means for connecting said pair of second intake port means and said passage means having an overall length of 0.57 to 1.37 m for transmitting a compression wave produced in one of said pair of second intake port means opening to one rotor cavity to the other of said pair of second intake port means opening to the other rotor cavity just before the other of said pair of second intake port means is closed to obtain an additional intake charge.

9. A rotary piston engine in accordance with claim 1 in which said main port means and said auxiliary port means have port closing timings different from each other by 20° to 60° in terms of angle of rotation of the eccentric shaft means.

10. A rotary piston engine as claimed in claim 1, wherein said control valve means is open in an engine speed range of 5000 to 7000 r.p.m.

11. A rotary piston engine as claimed in claim 10, wherein said control valve means is closed in an engine speed range of 3000 to 4500 r.p.m.

12. A rotary piston engine as claimed in claim 10, wherein said additional intake charge is obtained in an engine speed range of 3000 to 4500 r.p.m. and 5000 to 7000 r.p.m.

13. A rotary piston engine as claimed in claim 8, wherein said control valve means is open in an engine speed range of 5000 to 7000 r.p.m.

14. A rotary piston engine as claimed in claim 13, wherein said control valve means is closed in an engine speed range of 3000 to 4500 r.p.m.

15. A rotary piston engine as claimed in claim 13, wherein said additional intake charge is obtained in an engine speed range of 3000 to 4500 r.p.m. and 5000 to 7000 r.p.m.

* * * * *